(No Model.)
C. G. MAYER.
BRINE COOLING APPARATUS.
No. 314,038. Patented Mar. 17, 1885.
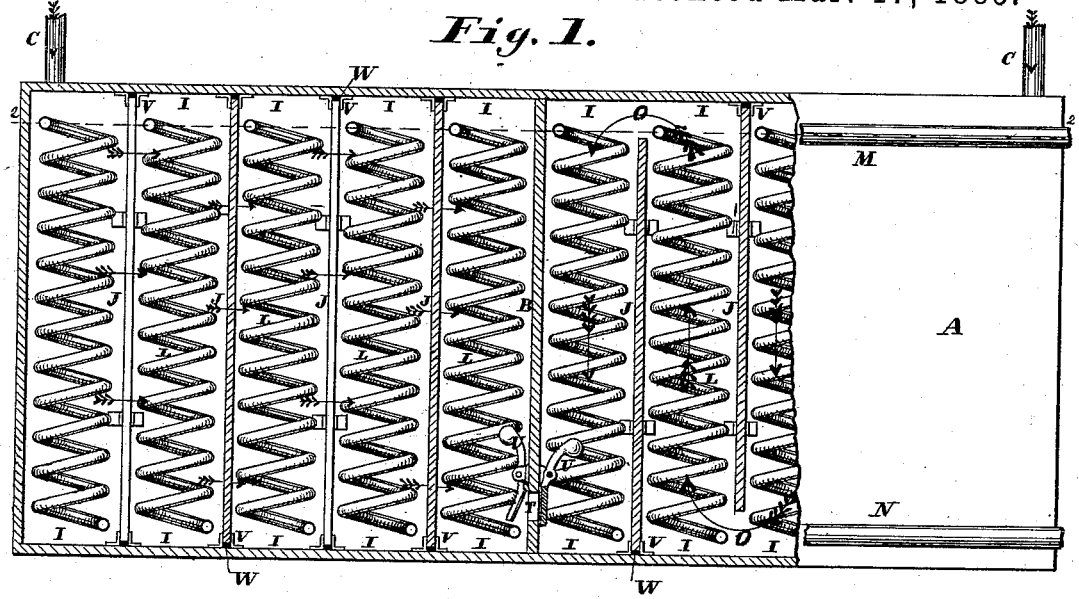
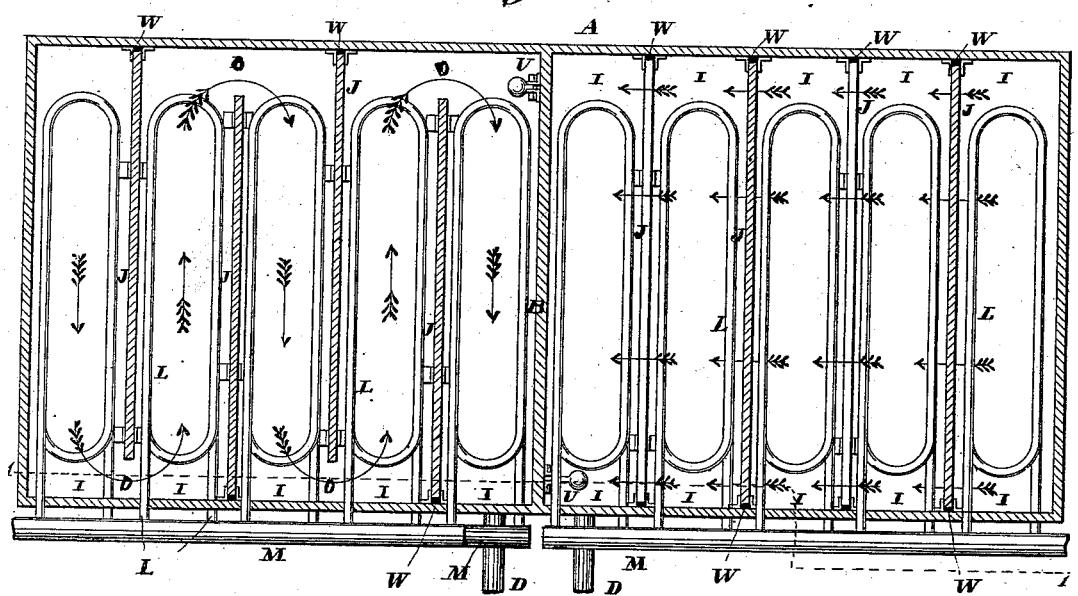
Attest:
Edward Steer
Geo. L. Wheelock
Inventor:
Chas. G. Mayer
By Wright Bros
Attys

UNITED STATES PATENT OFFICE.

CHARLES G. MAYER, OF NAUVOO, ILLINOIS.

BRINE-COOLING APPARATUS.

SPECIFICATION forming part of Letters Patent No. 314,038, dated March 17, 1885.

Application filed November 4, 1884. (No model.)

*To all whom it may concern:*

Be it known that I, CHARLES G. MAYER, of Nauvoo, Hancock county, Illinois, have invented a certain new and useful Improvement in Brine-Cooling Apparatuses, of which the following is a full, clear, and exact description, reference being had to the accompanying drawings, forming part of this specification, and in which—

Figure 1 is a part side view and part vertical section of my improved apparatus, the section being taken on line 1 1, Fig. 2; and Fig. 2 is a part top view and part horizontal section of same, the section being taken on line 2 2, Fig. 1.

My invention relates to an apparatus for cooling brine, &c., of refrigerating systems; and it consists in features of novelty hereinafter fully described, and pointed out in the claims.

Referring to the drawings, A represents a tank, which is preferably divided into two parts by a vertical partition, B, each part having a brine-supply pipe, C, and discharge-pipe D.

The tank is divided into a number of small compartments, I, by partitions J. In each compartment is a gas or ammonia pipe, L, coiled as shown. One end of each coil connects with a main supply-pipe, M, and the other end with a discharge-pipe, N. The partitions J do not extend entirely across the tank, leaving a space, O, which alternate, as shown, so that the brine or cooling-liquid entering the end compartment is made to traverse that compartment, and then enters the next, as indicated by the arrows, and so on until it leaves that division of the tank. Thus every particle of brine is made to pass through or over the coils, and becomes much more thoroughly and uniformly cooled than in the absence of the partitions, when the main body of circulation would take the shortest course from the inlet to the outlet pipe, passing diagonally across and through the center of the division of the tank. Instead of not extending entirely across the tank horizontally, they can do so and not extend quite to the top and bottom, alternately, of the tank, which would give the same results, the brine circulating vertically from one compartment to another, as shown on the left side of Fig. 1 and right side of Fig. 2.

The object of dividing the tank into two main compartments by the partition B is to keep the brine in the two parts separated as much as possible, the brine from one part being used for cooling beer, and the brine from the other being used for cooling rooms or cellars. In the latter the brine requires to be of a uniform temperature, as the temperature of the rooms or cellars must be kept uniform night and day. On the other hand, the brine for cooling the beer, &c., is of a variable temperature, as it is only used occasionally, and it would be an unnecessary expense to keep it cold when not in use. The tanks or compartments could of course be entirely separated from each other; but by the use of the partition there is less surface exposed to the outside atmosphere, and there is also a saving of material.

To avoid any danger of the partition being broken by all of the brine being removed from one of the compartments and the brine in the other compartment pressing with great force against it, I make holes T in the partition, and provide them with valves V, which are on opposite sides of the partition, and preferably on opposite ends, as shown. If the brine in one compartment becomes lowered, the valve on that side of the partition will be opened automatically by the pressure of the brine in the other compartment, and as soon as the pressure becomes equalized the heavy upper end of the valve will close it. Thus it will be seen that the brine in the two compartments will always be at or near the same height, and yet, when at the same height, will be kept separated.

I claim as my invention—

1. The combination of the tank provided with the partitions J, leaving spaces O, cooling-liquid supply and discharge pipes, gas-coils L, and main gas-pipes M and N, arranged and operating substantially as and for the purpose set forth.

2. The combination of a tank having partitions forming small compartments connected to form circulation-chambers, independent circulating gas-pipe in each compartment, brine inlet and outlet pipes, and main supply and discharge gas-pipes connected to each circulating gas-pipe, as set forth.

3. A brine-cooling tank divided into two parts by a central partition which is perforated and provided with valves, for the purpose specified.

CHARLES G. MAYER.

In presence of—
GEO. H. KNIGHT,
SAML. KNIGHT.